(12) United States Patent
Arai et al.

(10) Patent No.: US 10,655,200 B2
(45) Date of Patent: May 19, 2020

(54) STEEL MATERIAL AND OIL-WELL STEEL PIPE

(71) Applicant: Nippon Steel & Sumitomo Metal Corporation, Tokyo (JP)

(72) Inventors: Yuji Arai, Tokyo (JP); Kengo Hata, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 16/328,777

(22) PCT Filed: Aug. 30, 2017

(86) PCT No.: PCT/JP2017/031180
§ 371 (c)(1),
(2) Date: Feb. 27, 2019

(87) PCT Pub. No.: WO2018/043570
PCT Pub. Date: Mar. 8, 2018

(65) Prior Publication Data
US 2019/0226063 A1    Jul. 25, 2019

(30) Foreign Application Priority Data
Sep. 1, 2016  (JP) ................. 2016-170506

(51) Int. Cl.
*C22C 38/54*    (2006.01)
*C22C 38/52*    (2006.01)
(Continued)

(52) U.S. Cl.
CPC .............. *C22C 38/54* (2013.01); *C22C 38/00* (2013.01); *C22C 38/001* (2013.01);
(Continued)

(58) Field of Classification Search
CPC ....... C22C 38/00; C22C 38/54; C22C 38/001; C22C 38/002; C22C 38/005; C22C 38/02;
(Continued)

(56) References Cited

U.S. PATENT DOCUMENTS

2016/0160307 A1*  6/2016  Arai .................... B21B 3/00
148/593

FOREIGN PATENT DOCUMENTS

| JP | S56-5949 A | 1/1981 |
| JP | S57-35622 A | 2/1982 |
| JP | 2006-265657 A | 10/2006 |

OTHER PUBLICATIONS

English Abstract of JP-2006-265657.
English Abstract of JP-S56-005949.
English Abstract of JP-S57-035622.

* cited by examiner

*Primary Examiner* — Michael E. La Villa
(74) *Attorney, Agent, or Firm* — Banner & Witcoff, Ltd.

(57) ABSTRACT

The steel material according to the present invention contains, in mass %, C: 0.15 to 0.45%, Si: 0.10 to 1.0%, Mn: 0.10 to 0.8%, P: 0.050% or less, S: 0.010% or less, Al: 0.01 to 0.1%, N: 0.010% or less, Cr: 0.1 to 2.5%, Mo: 0.35 to 3.0%, Co: 0.05 to 2.0%, Ti: 0.003 to 0.040%, Nb: 0.003 to 0.050%, Cu: 0.01 to 0.50%, and Ni: 0.01 to 0.50%, and satisfies the following Formulae. A prior-austenite grain diameter of its microstructure is less than 5 μm, and a block diameter of its microstructure is less than 2 μm. The microstructure contains a total of 90% by volume or more of tempered martensite and tempered bainite.

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2).$$

16 Claims, 3 Drawing Sheets

(51) Int. Cl.
   C22C 38/50    (2006.01)
   C22C 38/48    (2006.01)
   C22C 38/46    (2006.01)
   C22C 38/44    (2006.01)
   C22C 38/42    (2006.01)
   C22C 38/06    (2006.01)
   C22C 38/04    (2006.01)
   C22C 38/02    (2006.01)
   C22C 38/00    (2006.01)
   F16L 9/02     (2006.01)
   F16L 58/00    (2006.01)
   C22C 38/20    (2006.01)
   C22C 38/40    (2006.01)
   C22C 38/16    (2006.01)
   C22C 38/32    (2006.01)
   C22C 38/30    (2006.01)
   C22C 38/14    (2006.01)
   C22C 38/18    (2006.01)
   C22C 38/10    (2006.01)
   C22C 38/24    (2006.01)
   C22C 38/12    (2006.01)
   C22C 38/08    (2006.01)
   C22C 38/26    (2006.01)
   C22C 38/28    (2006.01)
   C22C 38/22    (2006.01)
   C21D 8/10     (2006.01)
   C21D 9/08     (2006.01)

(52) U.S. Cl.
   CPC .......... *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *F16L 9/02* (2013.01); *F16L 58/00* (2013.01); *C21D 8/10* (2013.01); *C21D 9/08* (2013.01); *Y10T 428/12951* (2015.01); *Y10T 428/12958* (2015.01); *Y10T 428/12965* (2015.01); *Y10T 428/12972* (2015.01); *Y10T 428/13* (2015.01); *Y10T 428/26* (2015.01)

(58) Field of Classification Search
   CPC ......... C22C 38/04; C22C 38/06; C22C 38/42; C22C 38/44; C22C 38/46; C22C 38/48; C22C 38/50; C22C 38/52; C22C 38/08; C22C 38/10; C22C 38/105; C22C 38/12; C22C 38/14; C22C 38/16; C22C 38/18; C22C 38/20; C22C 38/22; C22C 38/24; C22C 38/26; C22C 38/28; C22C 38/30; C22C 38/32; C22C 38/40; F16L 9/02; F16L 58/00; C21D 9/08; C21D 8/10; Y10T 428/26; Y10T 428/13; Y10T 428/12951; Y10T 428/12972; Y10T 428/12958; Y10T 428/12965
   See application file for complete search history.

STEEL MATERIAL AND OIL-WELL STEEL PIPE

TECHNICAL FIELD

The present invention relates to a steel material and an oil-well steel pipe, and in particular to a steel material and an oil-well steel pipe suitable for use in a sour environment.

BACKGROUND ART

Due to the deepening of oil wells and gas wells (hereafter, oil wells and gas wells are collectively referred to as "oil wells"), there is a demand to enhance the strength of oil-well steel pipes. Specifically, oil-well steel pipes of 80 ksi grade (having a yield stress of 80 to 95 ksi, i.e., 551 to 655 MPa) and of 95 ksi grade (having a yield stress of 95 to 110 ksi, i.e., 655 to 758 MPa) have been widely used, and recently, oil-well steel pipes of 110 ksi grade (having a yield stress of 110 to 125 ksi, i.e., 758 to 862 MPa) and of 125 ksi grade (having a yield strength of 125 to 140 ksi, i.e., 862 to 965 MPa) have been demanded.

Deep wells are often situated in sour environments, which contain corrosive hydrogen sulfide. An oil-well steel pipe used in such a sour environment is required to have not only a high strength but also a sulfide stress cracking resistance (hereafter, referred to as SSC resistance) and a delayed fracture resistance (which are also collectively referred to as a hydrogen embrittlement resistance).

A steel with enhanced hydrogen embrittlement resistance is proposed in Japanese Patent Application Publication No. 56-5949 (Patent Literature 1) and Japanese Patent Application Publication No. 57-35622 (Patent Literature 2). The steels disclosed in these literatures contain Co, so as to enhance their hydrogen embrittlement resistance characteristics (SSC resistance, delayed fracture resistance).

Specifically, a high-tensile steel disclosed in Patent Literature 1 is produced by quenching and tempering a steel that contains a chemical composition containing C: 0.05 to 0.50%, Si: 0.10 to 0.28%, Mn: 0.10 to 2.0%, Co: 0.05 to 1.50%, Al: 0.01 to 0.10%, with the balance being Fe and unavoidable impurities, and has a proof stress of 60 kg/mm² or more.

A high-strength steel for oil well disclosed in Patent Literature 2 is produced by quenching a steel at 880 to 980° C. and tempering at 650 to 700° C., the steel that contains a chemical composition containing C: 0.27 to 0.50%, Si: 0.08 to 0.30%, Mn: 0.90 to 1.30%, Cr: 0.5 to 0.9%, Ni: 0.03% or less, V: 0.04 to 0.11%, Nb: 0.01 to 0.10%, Mo: 0.60 to 0.80%, Al: 0.1% or less, and Co: 3% or less, with the balance being Fe and unavoidable impurities, the unavoidable impurities containing P: 0.005% or less, S: 0.003% or less.

However, for the Co-containing steels of Patent Literature 1 and Patent Literature 2, their strengths can be insufficient when their contents of C are low. Hence, in regard to steel pipes for an oil-well steel pipe put to practical use, there is no stable production of oil country tubular goods of 125 ksi grade (having a yield strength of 862 MPa or more), which has SSC resistance allowing the oil country tubular goods to endure a standard condition for a constant load test ($H_2S$ environment at 1 atm) according to the NACE (National Association of Corrosion Engineers) TM0177 Method A.

Japanese Patent Application Publication No. 2006-265657 (Patent Literature 3) proposes an oil-well steel pipe of which a C content is increased to obtain a high strength. An oil-well steel pipe disclosed in Patent Literature 3 is produced by tempering on a low alloy steel after performing oil cooling quenching or austempering, the low alloy steel that has a chemical composition containing, in mass %, C: 0.30 to 0.60%, Si: 0.05 to 0.5%, Mn: 0.05 to 1.0%, Al: 0.005 to 0.10%, Cr+Mo: 1.5 to 3.0%, where Mo is 0.5% or more, V: 0.05 to 0.3%, with the balance being Fe and impurities in which P is 0.025% or less, S is 0.01% or less, B is 0.0010% or less, and O (oxygen) is 0.01% or less, and including a steel microstructure made of a bainite single phase. Patent Literature 3 describes that the above producing method provides a steel for oil well or an oil-well steel pipe that inhibits quench cracking likely to occur in quenching a high-carbon, low-alloy steel and has an excellent SSC resistance.

Now, conventional evaluation of SSC resistance on steel materials is based on, for example, tensile tests or bending tests such as a Method A test or a Method B test regulated in NACE TM0177. These tests use unnotched test specimens and have no consideration about SSC propagation arresting characteristics. Therefore, even steel materials evaluated by these tests as having excellent SSC resistance may suffer SSC due to propagation of latent cracks in the steel.

Accompanying the deepening of oil wells and the like in recent years, steel materials for oil country tubular goods are required to have more excellent SSC resistance than conventional practice. Accordingly, to further enhance the SSC resistance, it is preferable not only to prevent SSC from occurring but also to inhibit SSC from propagating. To inhibit SSC from propagating in steel, the steel needs to be enhanced in toughness. From this viewpoint, a DCB (Double Cantilever Beam) test of Method D regulated in NACE TM0177 has been imposed. Steel materials for oil country tubular goods used in a highly corrosive environment are required to provide high fracture toughness value (hereafter, abbreviated to $K_{ISSC}$) in a DCB test.

However, Patent Literature 1 to Patent Literature 3 give no consideration about the fracture toughness value in the DCB test.

CITATION LIST

Patent Literature

Patent Literature 1: Japanese Patent Application Publication No. 56-5949
Patent Literature 2: Japanese Patent Application Publication No. 57-35622
Patent Literature 3: Japanese patent Application Publication No. 2006-265657

SUMMARY OF INVENTION

Technical Problem

An object of the present invention is to provide a steel material and an oil-well steel pipe that high strengths of 862 MPa or more and excellent SSC resistance.

Solution to Problem

A steel material according to the present invention contains a chemical composition consisting of, in mass %, C: 0.15 to 0.45%, Si: 0.10 to 1.0%, Mn: 0.10 to 0.8%, P: 0.050% or less, S: 0.010% or less, Al: 0.01 to 0.1%, N: 0.010% or less, Cr: 0.1 to 2.5%, Mo: 0.35 to 3.0%, Co: 0.05 to 2.0%, Ti: 0.003 to 0.040%, Nb: 0.003 to 0.050%, Cu: 0.01 to 0.50%, Ni: 0.01 to 0.50%, V: 0 to 0.5%, B: 0 to 0.003%, W: 0 to 1.0%, Ca: 0 to 0.004%, Mg: 0 to 0.004%, and rare earth metal: 0 to 0.004%, with the balance being Fe and impurities, and satisfying Formulae (1) and (2). A prior-austenite grain diameter of its microstructure is less than 5 μm. A block diameter of the microstructure is less than 2 μm. The microstructure contains a total of 90% by volume or more of tempered martensite and tempered bainite.

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2)$$

$$\text{Effective B} = B - 11(N-Ti/3.4)/14 \quad (3)$$

Here, α in Formula (1) is 0.250 when the effective B defined by Formula (3) (mass %) is 0.0003% or more, or zero when the effective B is less than 0.0003%. Symbols of elements in Formula (1) to Formula (3) are to be substituted by contents of corresponding elements (in mass %).

Advantageous Effects of Invention

The steel material and the oil-well steel pipe according to the present invention have high strengths and excellent SSC resistance.

DESCRIPTION OF EMBODIMENTS

Figure 1:
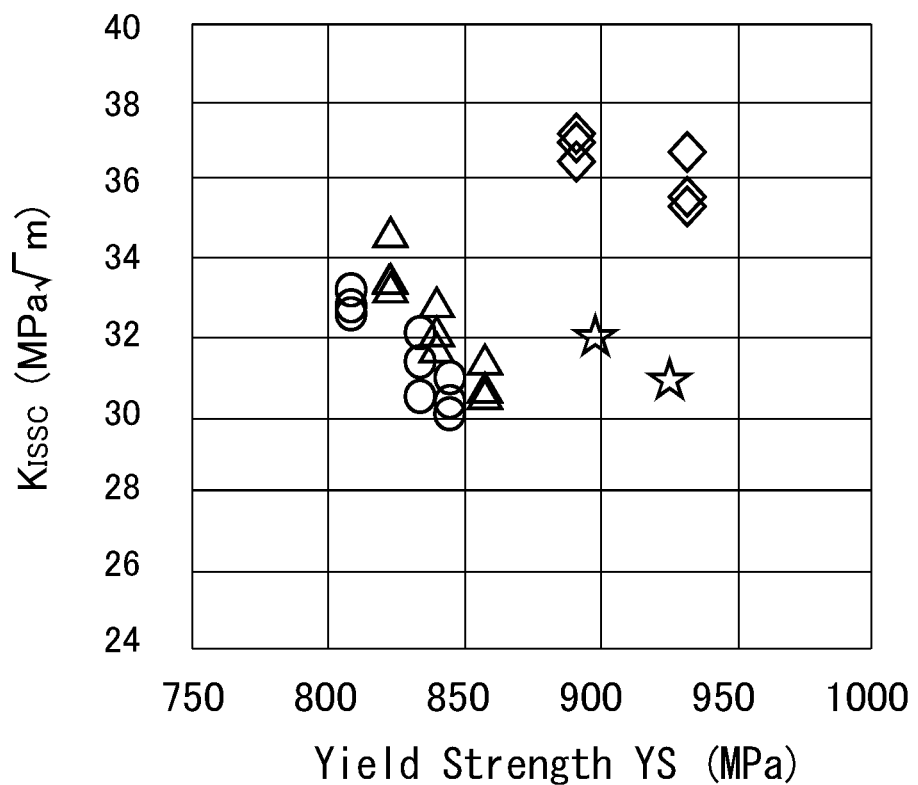
FIG. 1 is a graph illustrating correlations between yield strengths and fracture toughness values $K_{ISSC}$ of steels of respective test numbers.

In general, SSC resistance of steel deteriorates as strength of the steel increases. Hence, the present inventors conducted investigations and studies about a method for establishing compatibilities between strength as high as 862 MPa or more and SSC resistance in steel materials and oil-well steel pipe.

[SSC Resistance Brought by Co]

(1) Co enhances SSC resistance. Especially, an excellent SSC resistance is obtained in a steel material that contains a chemical composition containing, in mass %, C: 0.15 to 0.45%, Si: 0.10 to 1.0%, Mn: 0.10 to 0.8%, P: 0.050% or less, S: 0.010% or less, Al: 0.01 to 0.1%, N: 0.010% or less, Cr: 0.1 to 2.5%, Mo: 0.35 to 3.0%, Co: 0.05 to 2.0%, Ti: 0.003 to 0.040%, Nb: 0.003 to 0.050%, Cu: 0.01 to 0.50%, Ni: 0.01 to 0.50%, V: 0 to 0.5%, B: 0 to 0.003%, W: 0 to 1.0%, Ca: 0 to 0.004%, Mg: 0 to 0.004%, and rare earth metal: 0 to 0.004%, Co is contained of 0.05 to 2.0%. The reason for this is unclear, but the following reason is conceivable. When the steel material is used under a sour environment, Co is concentrated in an outer layer of the steel material. The Co concentrated in the outer layer inhibits hydrogen from entering the steel. In this way, it is considered that the SSC resistance is enhanced.

(2) As described above, containing certain amount of Co enables an excellent SSC resistance to be obtained, which is attributable to Co concentration in the outer layer. However, it is found that containing Co may decrease the SSC resistance in some cases.

Unlike other alloying elements (C, Mn, Cr, V, Cu, Ni, etc.), Co raises an Ms point, decreasing hardenability of the steel. Accordingly, when a content of Co is high as compared with a content of C, Mn, Cr, V, Cu, and Ni, a hardenability of the steel deteriorates. In this case, if the steel is produced by the same producing method as that for a steel containing no Co, a microstructure of the steel becomes a nonuniform microstructure that contains not only tempered martensite and tempered bainite but also retained austenite. Its SSC resistance therefore deteriorates, which is attributable to the microstructure. The present inventors thus conducted studies about a relation between Co and other alloying elements in regard to SSC resistance, and as a result, the following findings were obtained.

When the chemical composition further satisfies Formula (1) and Formula (2), excellent SSC resistance is obtained with the hardenability kept.

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2)$$

$$\text{Effective B} = B - 11(N-Ti/3.4)/14 \quad (3)$$

Here, α in Formula (1) is 0.250 when the effective B defined by Formula (3) (mass %) is 0.0003% or more, or zero when the effective B is less than 0.0003%. Symbols of elements in Formula (1) to Formula (3) are to be substituted by contents of corresponding elements (in mass %).

[Formula (1)]

F1 is defined as F1=C+Mn/6+(Cr+Mo+V)/5+(Cu+Ni)/15−Co/6+α. F1 is an index of hardenability. C, Mn, Cr, Mo, V, Cu, and certain amount of effective B (dissolved B) enhance hardenability of steel. In contrast, as described above, Co decreases hardenability of steel. When F1 is 0.70 or more, an excellent hardenability is obtained even with Co contained, and it is possible to increase volume ratio of tempered martensite and tempered bainite in a microstructure.

When a microstructure substantially consists of tempered martensite and tempered bainite, an excellent SSC resistance is obtained. However, when a microstructure is a nonuniform structure consisting of tempered martensite, tempered bainite, and other phases (retained austenite, etc.), SSC resistance is decreased. When F1 satisfies Formula (1), volume ratio of tempered martensite and tempered bainite in a microstructure becomes 90% or more in total, and an excellent SSC is obtained.

[Formula (2)]

When F1 satisfies Formula (1), a microstructure substantially includes tempered martensite and tempered bainite. However, when a steel material contains alloying elements excessively, the steel material traps (stores) hydrogen, which rather decreases its SSC resistance. Among elements that enhancing hardenability, Mn and Cr particularly enhances hardenability, whereas they can decrease SSC resistance. In contrast, C and Mo, as well as the above-described Co, are elements enhancing SSC resistance of steel.

F2 is defined as F2=(3C+Mo+3Co)/(3Mn+Cr). F2 is an index of SSC resistance. When F2 is 1.0 or more, that is, when a ratio of a content of SSC-resistant enhancing elements (C, Mo, Co) to a content of Mn and Cr is large, an excellent SSC resistance is obtained.

In addition to containing Co, the present inventors conducted studies about how to further enhance the SSC resistance. For this purpose, the present inventors focused on a steel microstructure, considering that refining prior γ grain diameter and block diameter increases boundaries, which increases the SSC resistance because the resistance to fracture increases. The present inventors conducted further investigations and studies on a relation between the prior γ grain diameter and the block diameter, strength, and the SSC resistance.

[Relation Between Prior γ Grain Diameter and Block Diameter, Strength, and SSC Resistance]

Steels having a chemical composition shown in Table 1 were subjected to a rolling process and a quenching process under conditions shown in Table 2.

method to be described later. The prior γ grain diameter was 16 μm for a test condition I, 9.8 μm for a test condition II, 2.6 μm for a test condition III, and a 4.1 or 4.2 μm for a test condition IV. Each steel was subjected to a tempering process under conditions shown in Table 3. For each steel after the tempering, block diameter was measured based on a test method to be described later. A test specimen was fabricated from each steel and subjected to a yield strength test and a DCB test based on test methods to be described later, and a yield strength and a fracture toughness value $K_{ISSC}$ of each steel were thereby determined. FIG. 1 is a graph illustrating correlations between yield strengths and fracture toughness values $K_{ISSC}$ of steels of respective test

TABLE 1

CHEMICAL COMPOSITION (UNIT IS mass %, BALANCE BEING Fe AND IMPURITIES)

| C | Si | Mn | P | S | Al | N | Cr | Mo | Co | Ti | Nb | Cu | Ni | V | Ca |
|---|----|----|----|---|----|----|----|----|----|----|----|----|----|----|----|
| 0.27 | 0.24 | 0.41 | 0.007 | 0.001 | 0.039 | 0.0018 | 0.49 | 0.69 | 0.25 | 0.010 | 0.017 | 0.02 | 0.02 | 0.100 | 0.0015 |

TABLE 2

| TEST CONDITIONS FOR ROLLING AND QUENCHING PROCESSES | HOT ROLLING CONDITIONS | QUENCHING CONDITIONS |
|---|---|---|
| I | HEATING TO 1250° C. THEN HOT ROLLING (70 mm → 15 mm THICK) → FINISHING AT 1000° C. THEN ALLOWING COOLING TO COOL TO ROOM TEMPERATURE | HEATING AT HEATING RATE OF 0.5° C./s IN NORMAL FURNACE (GAS-FIRED FURNACE) → HOLDING AT 920° C. FOR 20 min THEN QUENCHING → COOLING FROM 500 TO 200° C. AT COOLING RATE OF 4° C./s |
| II | HEATING TO 1250° C. THEN HOT ROLLING (70 mm → 15 mm THICK) → FINISHING AT 1000° C. THEN ALLOWING COOLING TO COOL TO ROOM TEMPERATURE | HEATING AT HEATING RATE OF 0.5° C./s IN NORMAL FURNACE (GAS-FIRED FURNACE) HOLDING AT 920° C. FOR 20 min THEN FIRST QUENCHING → REHEATING → HOLDING AT 900° C. FOR 20 min THEN SECOND QUENCHING → COOLING FROM 500 TO 200° C. AT COOLING RATE OF 4° C./s |
| III | HEATING TO 1250° C. THEN HOT ROLLING (70 mm → 35 mm THICK) → FINISHING AT 1000° C. THEN DIRECT WATER COOLING → REHEATING TO 650° C. AND WARM ROLLING (35 mm → 15 mm THICK) → ALLOWING COOLING TO COOL TO ROOM TEMPERATURE | HEATING TO 900° C. AT HEATING RATE OF 15° C./s IN HIGH-FREQUENCY INDUCTION FURNACE → HOLDING FOR 5 seconds THEN QUENCHING → WATER COOLING FROM 500 TO 200° C. AT COOLING RATE OF 7° C./s |
| IV | HEATING TO 1250° C. THEN HOT ROLLING (70 mm → 35 mm THICK) → FINISHING AT 1000° C. THEN DIRECT WATER COOLING → REHEATING TO 650° C. AND WARM ROLLING (35 mm → 15 mm THICK) → ALLOWING COOLING TO COOL TO ROOM TEMPERATURE | HEATING TO 900° C. AT HEATING RATE OF 15° C./s IN HIGH-FREQUENCY INDUCTION FURNACE → HOLDING FOR 5 seconds THEN QUENCHING → WATER COOLING FROM 500 TO 200° C. AT COOLING RATE OF 2° C./s |

At a stage after the quenching, a prior-austenite grain diameter (hereafter, also referred to as a prior γ grain diameter) was measured for each of the steels based on a test numbers. In FIG. 1, marks ○, Δ, ◇, and ☆ indicate results of the test condition I, the test condition II, the test condition III, and the test condition IV shown in Table 2, respectively.

TABLE 3

| TEST NUMBER | TEST CONDITIONS FOR ROLLING AND QUENCHING PROCESSES | PRIOR γ GRAIN DIAMETER (μm) | TEMPERING CONDITION TEMPERATURE (° C.) | HOLDING TIME (min) | BLOCK DIAMETER (μm) | YS (MPa) | TS (MPa) | $K_{ISSC}$ (MPa$\sqrt{m}$) |
|---|---|---|---|---|---|---|---|---|
| 1 | I | 16 | 695 | 60 | 2.7 | 847 | 897 | 30.5 |
| 2 | I | 16 | 695 | 60 | 2.7 | 847 | 897 | 30.1 |
| 3 | I | 16 | 695 | 60 | 2.7 | 847 | 897 | 30.9 |
| 4 | I | 16 | 700 | 60 | 2.7 | 833 | 891 | 32.0 |
| 5 | I | 16 | 700 | 60 | 2.7 | 833 | 891 | 30.5 |
| 6 | I | 16 | 700 | 60 | 2.7 | 833 | 891 | 31.3 |
| 7 | I | 16 | 705 | 60 | 2.7 | 809 | 870 | 33.0 |
| 8 | I | 16 | 705 | 60 | 2.7 | 809 | 870 | 32.9 |
| 9 | I | 16 | 705 | 60 | 2.7 | 809 | 870 | 33.2 |
| 10 | II | 9.8 | 695 | 60 | 2.4 | 859 | 897 | 30.5 |
| 11 | II | 9.8 | 695 | 60 | 2.4 | 859 | 897 | 31.4 |
| 12 | II | 9.8 | 695 | 60 | 2.4 | 859 | 897 | 30.8 |
| 13 | II | 9.8 | 700 | 60 | 2.4 | 839 | 878 | 32.7 |
| 14 | II | 9.8 | 700 | 60 | 2.4 | 839 | 878 | 31.9 |
| 15 | II | 9.8 | 700 | 60 | 2.4 | 839 | 878 | 32.5 |
| 16 | II | 9.8 | 705 | 60 | 2.4 | 824 | 862 | 34.6 |
| 17 | II | 9.8 | 705 | 60 | 2.4 | 824 | 862 | 33.2 |
| 18 | II | 9.8 | 705 | 60 | 2.4 | 824 | 862 | 33.5 |
| 19 | III | 2.6 | 690 | 120 | 1.4 | 930 | 954 | 35.5 |
| 20 | III | 2.6 | 690 | 120 | 1.4 | 930 | 954 | 35.2 |
| 21 | III | 2.6 | 690 | 120 | 1.4 | 930 | 954 | 36.6 |
| 22 | III | 2.6 | 700 | 120 | 1.4 | 890 | 937 | 37.2 |
| 23 | III | 2.6 | 700 | 120 | 1.4 | 890 | 937 | 36.7 |
| 24 | III | 2.6 | 700 | 120 | 1.4 | 890 | 937 | 37.0 |
| 25 | IV | 4.1 | 700 | 60 | 2.1 | 900 | 957 | 32.1 |
| 26 | IV | 4.2 | 690 | 120 | 2.2 | 925 | 980 | 31.1 |

Referring to Table 3, as to Test Number 1 to Test Number 24, their structures subjected to the quenching and the tempering are refined by refining their prior γ grains. That is, their blocks are refined. In this case, their SSC resistance are enhanced.

Specifically, during the quenching, steel undergoes transformation from austenite to martensite and bainite. At this point, when its austenite grains are fine, its martensite blocks and bainite blocks transformed from the austenite grains are also refined. The martensite blocks are substructures of the martensite. The bainite blocks are substructures of the bainite. In a crystal orientation map obtained by the Field emission scanning electron microscope-Electron backscatter diffraction pattern (FESEM-EBSP) method, which will be described later, a boundary between a martensite grain and a bainite grain having an orientation difference of 15° or more is defined as a block boundary. A zone surrounded by a block boundary is defined as one block.

However, referring to Test Number 25 and Test Number 26 shown in Table 3, even fine prior γ grains can result in low SSC resistance. More specifically, even when a prior γ grain is as fine as less than 5 μm, a block diameter of 2 μm or more results in a low SSC resistance.

Referring to Table 3 and FIG. 1, when prior γ grains in a microstructure are fine and moreover a block diameter is also fine, a high SSC resistance is obtained even strength of the steel is increased. Specifically, it is possible to establish compatibility between strength and SSC resistance of the steel when an average grain diameter of prior γ grains in a microstructure is less than 5 μm, and an average block diameter of blocks is less than 2 μm.

[Relation Between Co and Block Diameter]

In addition, the inventors of the present application focused on and studied a relation between Co and block diameter in that there is a case where SSC resistance is low even with a fine prior γ grain in Table 3. As a result, the following findings were obtained.

Co coarsens block diameters. Hence, with Co contained, a block diameter can be coarsened even with fine prior γ grains. The reason for this is unclear, but it is considered that the block diameter is coarsened by Co raising an Ms point to decrease the hardenability.

Hence, the present inventors further conducted studies about a method for inhibiting the block diameter from being coarsened even when certain amount of Co is contained in the above-described chemical composition. As a result, the following findings were obtained.

For example, when a heating rate in the quenching is set at 10° C./s or more, it is possible to reduce an average grain diameter of prior γ grains in a microstructure to less than 5 μm. Without Co contained, when the average grain diameter of prior γ grains in the microstructure is less than 5 μm, a block diameter also becomes as fine as less than 2 μm.

However, with Co contained, Co coarsens the block diameter as described above. For that reason, the block diameter may be 2 μm or more in some cases even when the average grain diameter of prior γ grains of the microstructure is less than 5 μm. In this case, the SSC resistance is low.

Hence, for example, in a quenching process, the heating rate in the quenching is set at 10° C./s or more, and in addition, rapid cooling is used for cooling to the Ms point. More specifically, the present inventors found that setting a cooling rate for 500 to 200° C. at 5° C./s or more makes it possible to inhibit grains from being coarsened in the quenching process to reduce the block diameter to less than 2 μm.

A steel material according to the present invention, which has been completed based on the above findings, contains a chemical composition consisting of, in mass %, C: 0.15 to 0.45%, Si: 0.10 to 1.0%, Mn: 0.10 to 0.8%, P: 0.050% or less, S: 0.010% or less, Al: 0.01 to 0.1%, N: 0.010% or less, Cr: 0.1 to 2.5%, Mo: 0.35 to 3.0%, Co: 0.05 to 2.0%, Ti: 0.003 to 0.040%, Nb: 0.003 to 0.050%, Cu: 0.01 to 0.50%, Ni: 0.01 to 0.50%, V: 0 to 0.5%, B: 0 to 0.003%, W: 0 to 1.0%, Ca: 0 to 0.004%, Mg: 0 to 0.004%, and rare earth metal: 0 to 0.004%, with the balance being Fe and impurities, and satisfying Formulae (1) and (2). A prior-austenite grain diameter of its microstructure is less than 5 μm. A block diameter of the microstructure is less than 2 μm. The microstructure contains tempered martensite and tempered bainite at 90% by volume or more.

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2)$$

$$\text{Effective B} = B - 11(N-Ti/3.4)/14 \quad (3)$$

Here, α in Formula (1) is 0.250 when the effective B defined by Formula (3) (mass %) is 0.0003% or more, or zero when the effective B is less than 0.0003%. Symbols of elements in Formula (1) to Formula (3) are to be substituted by contents of corresponding elements (in mass %).

The chemical composition may contain V: 0.015 to 0.5%.

The chemical composition may contain one or more types of element selected from the group consisting of B: 0.0003 to 0.003% and W: 0.05 to 1.0%.

The chemical composition may contain one or more types of element selected from the group consisting of Ca: 0.0003 to 0.004%, Mg: 0.0003 to 0.004%, and rare earth metal: 0.0003 to 0.004%.

Having the above chemical composition and the microstructure, an oil-well steel pipe according to the present invention exhibits excellent strength and SSC resistance even when its wall thickness is 15 mm or more.

The steel material and the oil-well steel pipe according to the present invention will be described below in detail. The sign "%" following each element means mass % unless otherwise noted.

[Chemical Composition]

The chemical composition of the steel material according to the present invention contains the following elements.

C: 0.15 to 0.45%

Carbon (C) enhances hardenability, enhancing strength of steel. In addition, C promotes spheroidization of carbides in tempering in a production process, enhancing SSC resistance. Moreover, C combines with Mo or V to form their carbides, enhancing temper softening resistance. Further, when the carbides disperse, the strength of steel is enhanced. An excessively low content of C results in failure to provide these effects. In contrast, an excessively high content of C decreases toughness of steel, making quench cracking more likely to occur. Accordingly, the C content is 0.15 to 0.45%. A lower limit of the C content is preferably 0.20%, more preferably 0.25%. An upper limit of the C content is preferably 0.35%, more preferably 0.30%.

Si: 0.10 to 1.0%

Silicon (Si) deoxidizes steel. An excessively low content of Si fails to provide this effect. In contrast, an excessively high content of Si causes retained austenite to be produced excessively, decreasing SSC resistance of steel. Accordingly, the Si content is 0.10 to 1.0%. A lower limit of the Si content is preferably 0.15%, more preferably 0.20%. An upper limit of the Si content is preferably 0.85%, more preferably 0.50%.

Mn: 0.10 to 0.8%

Manganese (Mn) deoxidizes steel. In addition, Mn enhances hardenability, enhancing strength of steel. An excessively low content of Mn fails to provide these effects. In contrast, an excessively high content of Mn causes Mn to segregate in grain boundaries, together with impurities such as P and S. In this case, SSC resistance of steel deteriorates. Accordingly, the Mn content is 0.10 to 0.8%. A lower limit of the Mn content is preferably 0.25%, more preferably 0.28%. An upper limit of the Mn content is preferably 0.65%.

P: 0.050% or Less

Phosphorus (P) is an impurity. P segregates in grain boundaries, decreasing SSC resistance of steel. Accordingly, the P content is 0.050% or less. The P content is preferably 0.020% or less. The P content is preferably as low as possible.

S: 0.010% or Less

Sulfur (S) is an impurity. S segregates in grain boundaries, decreasing SSC resistance of steel. Accordingly, the S content is 0.010% or less. The S content is preferably 0.005% or less, more preferably 0.003% or less. The S content is preferably as low as possible.

Al: 0.01 to 0.1%

Aluminum (Al) deoxidizes steel. An excessively low Al content fails to provide this effect, decreasing SSC resistance of steel. In contrast, an excessively high content of Al causes coarse oxide-based inclusions to be produced, decreasing SSC resistance of steel. Accordingly, the Al content is 0.01 to 0.1%. A lower limit of the Al content is preferably 0.015%, more preferably 0.020%. An upper limit of the Al content is preferably 0.08%, more preferably 0.05%. The term content of "Al" used herein means a content of "acid-soluble Al", that is, "sol. Al".

N: 0.010% or Less

Nitrogen (N) is unavoidably contained. N forms coarse nitride, decreasing SSC resistance of steel. Accordingly, the N content is 0.010% or less. The N content is preferably 0.005% or less, more preferably 0.004% or less. The N content is preferably as low as possible. However, when a small amount of Ti is contained with an intention of refining grains through precipitation of its fine nitride, 0.002% or more of N is preferably contained.

Cr: 0.1 to 2.5%

Chromium (Cr) enhances a hardenability of steel, enhancing strength of the steel. An excessively low content of Cr fails to provide this effect. In contrast, an excessively high content of Cr decreases SSC resistance of steel. Accordingly, the Cr content is 0.1 to 2.5%. A lower limit of the Cr content is preferably 0.25%, more preferably 0.30%. An upper limit of the Cr content is preferably 1.5%, more preferably 1.3%.

Mo: 0.35 to 3.0%

Molybdenum (Mo) enhances a hardenability of steel. In addition, Mo forms its fine carbides, enhancing temper softening resistance of steel, and enhancing SSC resistance in a high-pressure $H_2S$ environment. An excessively low content of Mo fails to provide these effects. In contrast, an excessively high content of Mo causes the effects saturate. Accordingly, the Mo content is 0.35 to 3.0%. A lower limit of the Mo content is preferably 0.40%, more preferably 0.50%. An upper limit of the Mo content is preferably 2.0%, more preferably 1.75%.

Co: 0.05 to 2.0%

Cobalt (Co) enhances SSC resistance of steel in a high $H_2S$ environment. The reason for this is unclear, but the following reason is conceivable. In a sour environment, Co concentrates in a surface of steel, inhibiting hydrogen from entering the steel. This enhances SSC resistance of the steel. An excessively low content of Co fails to provide this effect. In contrast, an excessively high content of Co decreases a hardenability of steel, decreasing strength of the steel. In addition, an excessively high content of Co causes a block diameter to be coarsened, decreasing SSC resistance. Accordingly, the Co content is 0.05 to 2.0%. A lower limit of the Co content is preferably more than 0.05%, more preferably 0.10%, still more preferably 0.25%. An upper limit of the Co content is preferably 1.5%, more preferably 1.25%.

Ti: 0.003 to 0.040%

Titanium (Ti) forms its nitrides, exerting a pinning effect to refine grains. This enhances strength of steel. An excessively low content of Ti fails to provide this effect. In contrast, an excessively high content of Ti causes the Ti nitride to be coarsened, decreasing SSC resistance of steel. Accordingly, the Ti content is 0.003 to 0.040%. A lower limit of the Ti content is preferably 0.005%. An upper limit of the Ti content is preferably 0.020%, more preferably 0.015%.

Nb: 0.003 to 0.050%

Niobium (Nb) combines with C and/or N to form its carbides, nitrides, or carbo-nitrides (hereafter, referred to as carbo-nitrides etc.). These carbo-nitrides etc. refine grains, enhancing strength of steel. An excessively low content of Nb fails to provide this effect. In contrast, an excessively high content of Nb causes coarse precipitates to be produced, decreasing SSC resistance of steel. Accordingly, the Nb content is 0.003 to 0.050%. A lower limit of the Nb content is preferably 0.007%, more preferably 0.010%. An upper limit of the Nb content is preferably 0.025%.

Cu: 0.01 to 0.50%

Copper (Cu) enhances a hardenability of steel, enhancing strength of the steel. An excessively low content of Cu fails to provide these effects. In contrast, an excessively high content of Cu causes steel to trap hydrogen, decreasing SSC resistance. Accordingly, the Cu content is 0.01 to 0.50%. A lower limit of the Cu content is preferably 0.02%, more preferably 0.05%. An upper limit of the Cu content is preferably 0.35%, more preferably 0.25%.

Ni: 0.01 to 0.50%

Nickel (Ni) enhances a hardenability of steel, enhancing strength of the steel. An excessively low content of Ni fails to provide these effects. In contrast, an excessively high content of Ni promotes local corrosion, decreasing SSC resistance. Accordingly, the Ni content is 0.01 to 0.50%/a. A lower limit of the Ni content is preferably 0.02%, more preferably 0.05%. An upper limit of the Ni content is preferably 0.45%, more preferably 0.25%.

The balance of the chemical composition of the steel material according to the present invention is Fe and impurities. Here, the impurities refer to those that are mixed from ores and scraps used as raw materials of the steel material, a production environment, or the like, in producing the steel material in an industrial manner, and are allowed to be mixed in the steel material within ranges in which the impurities have no adverse effect on the steel material according to the present invention.

[Optional Elements]

The chemical composition of the steel material described above may further contain V as a substitute for a part of Fe.

V: 0 to 0.5%

Vanadium (V) is an optional element and may not be contained. When contained, V forms its carbo-nitrides etc., refining grains to enhance strength of steel. However, an excessively high content of V decreases a toughness of steel. Accordingly, the V content is 0 to 0.5%. A lower limit of the V content is preferably 0.015%, more preferably 0.030%. An upper limit of the V content is preferably 0.30%, more preferably 0.20%.

The chemical composition of the steel material described above may further contain, as a substitute for a part of Fe, one or more types of element selected from the group consisting of B and W.

B: 0 to 0.003%

Boron (B) is an optional element and may not be contained. When contained, B is dissolved in steel, enhancing a hardenability of the steel and enhancing strength of the steel. However, an excessively high content of B causes its coarse nitride to be produced, decreasing SSC resistance of steel. Accordingly, the B content is 0 to 0.003%. A lower limit of the B content is preferably 0.0003%, more preferably 0.0007%. An upper limit of the B content is preferably 0.0015%, more preferably 0.0012%.

W: 0 to 1.0%

Tungsten (W) is an optional element and may not be contained. When contained, W is dissolved in steel, enhancing a hardenability of the steel and enhancing strength of the steel. However, an excessively high content of W causes its coarse carbide to be produced, decreasing SSC resistance of steel. Accordingly, the W content is 0 to 1.0%. A lower limit of the W content is preferably 0.05%, more preferably 0.10%. An upper limit of the W content is preferably 0.75%, more preferably 0.5%.

The chemical composition of the steel material described above may further contain, as a substitute for a part of Fe, one or more types of element selected from the group consisting of Ca, Mg, and rare earth metal. These elements are all optional and improve shapes of sulfides, enhancing SSC resistance of steel.

Ca: 0 to 0.004%

Calcium (Ca) is an optional element and may not be contained. When contained, Ca combines with S in steel. This renders S in a steel harmless in a form of sulfides, enhancing SSC resistance of the steel. However, an excessively high content of Ca causes oxide in steel to be coarsened, decreasing SSC resistance of the steel. Accordingly, the Ca content is 0 to 0.004%. A lower limit of the Ca content is preferably 0.0003%, more preferably 0.0006%. An upper limit of the Ca content is preferably 0.0025%, more preferably 0.0020%.

Mg: 0 to 0.004%

Magnesium (Mg) is an optional element and may not be contained. When contained, Mg renders S in a steel harmless in a form of its sulfide, enhancing SSC resistance of the steel. However, an excessively high content of Mg causes oxide in steel to be coarsened, decreasing SSC resistance of the steel. Accordingly, the Mg content is 0 to 0.004%. A lower limit of the Mg content is preferably 0.0003%, more preferably 0.0006%, still more preferably 0.0010%. An upper limit of the Mg content is preferably 0.0025%, more preferably 0.0020%.

Rare Earth Metal: 0 to 0.004%

Rare earth metal (REM) is an optional element and may not be contained. When contained, REM refines sulfides in steel, enhancing SSC resistance of the steel. In addition, REM combines with P in a steel to inhibit P from segregating in crystal grain boundaries. This inhibits decrease of SSC resistance of steel attributable to the segregation of P. However, an excessively high content of REM causes oxide to be coarsened, decreasing SSC resistance of the steel. Accordingly, the REM content is 0 to 0.004%. A lower limit of the REM content is preferably 0.0003%, more preferably 0.0006%, still more preferably 0.0010%. An upper limit of the REM content is preferably 0.0025%, more preferably 0.0020%.

REM herein refers to one or more types of element selected from the group consisting of yttrium (Y) with atomic number 39, lanthanoid including lantern (La) with atomic number 57 to lutetium (Lu) with atomic number 71, and actinoid including actinium (Ac) with atomic number 89 to lawrencium (Lr) with atomic number 103. The REM content used herein refers to a total content of these elements.

[Formula (1) and Formula (2)]

The chemical composition further satisfies Formula (1) and Formula (2).

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2)$$

$$\text{Effective } B = B - 11(N-Ti/3.4)/14 \quad (3)$$

Here, $\alpha$ in Formula (1) is 0.250 when the effective B defined by Formula (3) (mass %) is 0.0003% or more, or zero when the effective B is less than 0.0003%. Symbols of elements in Formula (1) to Formula (3) are to be substituted by contents of corresponding elements (in mass %).

[Formula (1)]

F1 is defined as $F1=C+Mn/6+(Cr+Mo+V)/5+(Cu+Ni)/15-Co/6+\alpha$. F1 is an index of hardenability. When F1 is 0.70 or more, an excellent hardenability is obtained even with Co contained, and volume ratios of tempered martensite and tempered bainite in a microstructure become 90% or more in total. As a result, an excellent SSC resistance is obtained. A lower limit of F1 is preferably 0.75, more preferably 0.85, still more preferably 1.0. An upper limit of F1 is preferably 1.5.

In F1, $\alpha$ is determined depending on an amount of effective B (amount of dissolved B), which is defined by Formula (3). Specifically, a is 0.250 when the effective B defined by Formula (3) is 0.0003% or more, or zero when the effective B is less than 0.0003%. When the effective B in Formula (3) is more than the B content, the value of effective B is taken as being equal to the B content.

[Formula (2)]

F2 is defined as $F2=(3C+Mo+3Co)/(3Mn+Cr)$. F2 is an index of SSC resistance. When F2 is 1.0 or more, a ratio of a content of SSC-resistant enhancing elements (C, Mo, and Co) to a content of Mn and Cr (elements that contribute to the hardenability, while their excessive content can decrease the SSC resistance) is large. As a result, an excellent SSC resistance in a high-pressure $H_2S$ environment is obtained. An upper limit of F2 is preferably 3.0.

[Microstructure]

[Prior γ Grain Diameter and Block Diameter]

In a microstructure of the steel material according to the present invention, a prior γ grain diameter is less than 5 μm. In the microstructure, a block diameter is less than 2 μm. As a result, it is possible to establish compatibility between strength as high as a yield strength of 862 MPa or more and SSC resistance.

Of martensitic substructures, a group of laths with the substantially same orientation is called a martensite block. Of bainitic substructures, a group of bainite laths with the substantially same orientation is called a bainite block. In the present embodiment, martensite blocks and bainite blocks are collectively called blocks. In the present embodiment, in a crystal orientation map obtained by the Field emission scanning electron microscope-Electron backscatter diffraction pattern (FESEM-EBSP) method, which will be described later, a boundary between a martensite grain and a bainite grain having an orientation difference of 15° or more is defined as a block boundary. A zone surrounded by a block boundary is defined as one block.

By refining blocks, it is possible to enhance hardness of martensite and bainite. By enhancing the hardness of martensite and bainite, it is possible to enhance strengths of the martensite and the bainite. In addition, by refining blocks, it is possible to enhance the SSC resistance. As a result, it is possible to establish compatibility between strength as high as a yield strength of 862 MPa or more and SSC resistance. A lower limit of a block diameter is preferably 0.2 μm.

To refine blocks, prior γ grains are first refined. Hence, for example, a heating rate in quenching is set at 10° C./s or more. However, when Co is contained as in the present embodiment, Co raises an Ms point. Hence, with Co contained, a block diameter can be coarsened even with fine prior γ grains.

The reason for this is unclear, but it is considered that the block diameter is coarsened by Co raising an Ms point to decrease the hardenability.

Thus, in the present embodiment, a cooling rate in the quenching process from 500 to 200° C. is set at 5° C./s or more. In this case, it is possible to inhibit the grains from being coarsened sufficiently in the quenching, so as to reduce the block diameter to less than 2 μm.

[Method for Measuring Prior γ Grain Diameter]

The prior γ grain diameter is determined by the following method. A test specimen is taken from an as-quenched steel material. In a case of a steel pipe, a cross section of the test specimen is a face of the steel pipe perpendicular to an axis of the steel pipe, and the test specimen is taken from a wall-thickness center portion of the steel pipe. The test specimen is subjected to mirror polish, and then its prior γ grains are exposed by using picric acid saturated aqueous solution. In the test specimen, a prior γ grain diameter (average grain diameter of prior γ grains) is measured on each of any ten visual fields. The measurement is performed by an intercept method described in JIS G0551(2005) with observation under an 1000× optical microscope. In each visual field, a prior-γ grain size number is calculated. Ten calculated prior-γ grain size numbers are averaged to determine their average (an average prior-γ grain size number). Based on the average prior-γ grain size number, an average area of the grains is calculated. From the average area, a circle equivalent diameter is calculated, and the circle equivalent diameter is determined as the prior γ grain diameter.

[Method for Measuring Block Diameter]

In the present embodiment, the block diameter (μm) is determined based on a crystal orientation map obtained by the FESEM-EBSP, without distinction between martensite blocks and bainite blocks. Specifically, EBSP measurement is performed on 50 μm×50 μm visual fields with 0.1 μm pitches therebetween. From the EBSP measurement, a Kikuchi pattern is taken, from which an orientation of αFe is identified. Based on the orientation of αFe, a crystal orientation figure is determined. From the crystal orientation figure, zones surrounded by orientation differences with adjacent crystals of 15° or more are determined, and a crystal orientation map is obtained. A zone surrounded by orientation differences of 15° or more is defined as one grain in a block. For each block, its circle equivalent diameter is determined from its area. An average value of circle equivalent diameters in the visual fields is calculated and determined as the block diameter.

[Tempered Martensite and Tempered Bainite]

The steel material according to the present invention contains Co. Co raises an Ms point. Therefore, a microstructure of the steel material according to the present invention mainly includes tempered martensite and tempered bainite. More specifically, the microstructure includes a total of 90% by volume or more of tempered martensite and tempered bainite. The balance of the microstructure includes, for example, retained austenite and the like. When a microstructure contains a total of 90% by volume or more of tempered martensite and tempered bainite, SSC resistance is enhanced. The microstructure preferably consists of a tempered martensite single phase. A content of the tempered bainite is preferably 2 to 10% by volume.

The volume ratio of the tempered martensite and the tempered bainite in the microstructure correlates with a difference between a maximum value and a minimum value of Rockwell hardness (HRC) of a steel material after quenching and tempering.

The maximum value of Rockwell hardness of the steel material subjected to quenching and tempering is defined as HRCmax. The minimum value of Rockwell hardness of the steel material subjected to quenching and tempering is defined as HRCmin. The difference between HRCmax and HRCmin is defined as ΔHRC.

$$\Delta HRC = HRC\text{max} - HRC\text{min}$$

When ΔHRC is less than 2.0, it is considered that a microstructure of a steel material includes a total of 90% or more of a volume ratio of tempered martensite and tempered bainite.

For example, in a steel material, a Rockwell hardness at a steel material surface stands at HRCmax, and a Rockwell hardness at a thickness center portion of the steel material (hereafter, referred to as a steel material center portion) stands at HRCmin. The reason for this is as follows. A cooling rate in quench cooling is high at the steel material surface and low at the steel material center portion. In an as-quenched steel material, therefore, a difference in volume ratio of martensite and bainite between its steel material surface and its steel material center portion can be large. Since the volume ratio of martensite and bainite in a microstructure correlates with Rockwell hardness, the difference in Rockwell hardness between the steel material surface and the steel material center portion of the as-quenched steel material is large in this case. When the steel material is subjected to tempering treatment, hardness of the steel material decreases at both of the steel material surface and the steel material center portion, and the difference in Rockwell hardness between the steel material surface and the steel material center portion also decreases, but the difference in Rockwell hardness between the steel material surface and the steel material center portion still remains. Hence, the Rockwell hardness at the steel material surface is HRCmax, and the Rockwell hardness at the steel material center portion is HRCmin. When ΔHRC is 2.0 or more, the hardness of the steel material center portion is too low. When ΔHRC is less than 2.0, a sufficient hardness is obtained even at the steel material center portion, and in this case, it is considered that a volume ratio of tempered martensite and tempered bainite at the steel material center portion is 90% or more in total.

The ΔHRC is measured by the following method. To determine a Rockwell hardness (HRC), the Rockwell hardness test (scale C) conforming to JIS Z2245(2011) is conducted at any three spots in each of a 2.0-mm depth position from a top surface of a steel material (outer surface in a case of a steel pipe), a 2.0-mm depth position from a bottom surface of the steel material (inner surface in the case of the steel pipe), and a thickness-direction center position of the steel material. Of resultant hardness, a maximum value is determined as HRCmax, and a minimum value is determined as HRCmin, and when ΔHRC is less than 2.0, a volume ratio of tempered martensite and tempered bainite of the steel material is determined to be 90% or more in total. When ΔHRC is 2.0 or more, the volume ratio of tempered martensite and tempered bainite is determined to be less than 90% in total at the position of HRCmin.

[Shape of Steel Material]

A shape of the steel material is not limited to a particular shape. The steel material is, for example, a steel pipe or a steel plate. When the steel material is an oil-well steel pipe, its preferable wall thickness is 9 to 60 mm. The present invention is suitable particularly to a thick-wall oil-well steel pipe. More specifically, even when the steel material according to the present invention is a thick-wall oil-well steel pipe having a thickness of 15 mm or more, or 20 mm or more, the steel material exerts a high strength and an excellent SSC resistance.

[Strength of Steel Material]

A yield strength of the steel material of the present embodiment is 862 MPa or more. The yield strength used herein refers to a lower yield point (MPa). In short, the yield strength of the steel material of the present embodiment is 125 ksi grade. Even with such a high strength, the steel material of the present embodiment has an excellent SSC resistance by including the chemical composition and microstructure described above.

[Producing Method]

As an example of a method for producing the steel material described above, a method for producing an oil-well steel pipe will be described. The method for producing an oil-well steel pipe includes a process of preparing a starting material (preparing process), a process of subjecting the starting material to hot working to produce a hollow shell (hot working process), and processes of subjecting the hollow shell to quenching and tempering to produce an oil-well steel pipe (quenching process and tempering process). Each of the processes will be described below in detail.

[Preparing Process]

A molten steel having the above-described chemical composition and satisfies Formula (1) and Formula (2) is produced. The molten steel is used to produce the starting material. Specifically, the molten steel is used to produce a cast piece (a slab, a bloom, or a billet) through a continuous casting process. The molten steel may be used to produce an ingot through an ingot-making process. The slab, bloom, or ingot may be subjected to billeting to be produced into a billet as necessary. Through the processes, the starting material (the slab, bloom, or billet) is produced.

[Hot Working Process]

The prepared starting material is subjected to hot working to be produced into a hollow shell. First, the billet is heated in a reheating furnace. The billet taken from the reheating furnace is subjected to hot working to be produced into a hollow shell (seamless steel pipe). For example, the Mannesmann process is performed as the hot working to produce the hollow shell. In this case, a piercing machine is used to subject a round billet to piercing-rolling. The round billet subjected to the piercing-rolling is further subjected to hot rolling by a mandrel mill, a reducer, a sizing mill, or the like, to be produced into the hollow shell.

The hollow shell may be produced from the billet by other hot working processes. For example, in a case of a short-length thick-wall oil-well steel pipe, such as a coupling, the hollow shell may be produced by forging. Through the above processes, the hollow shell, having a wall thickness of 9 to 60 mm, is produced.

The hollow shell produced by the hot working may be air-cooled (As-Rolled). The steel pipe produced by the hot working may be subjected to, rather than cooling to normal temperature, direct quenching after the hot rolling or to quenching after the hot rolling and subsequent supplementary heating (reheating). However, when the direct quenching or the quenching after the supplementary heating is performed, it is more preferable to stop the cooling in the middle of the quenching or perform gentle cooling, for a purpose of preventing quench cracking.

When the direct quenching after the hot rolling or the quenching after the hot rolling and the subsequent supplementary heating is performed, it is preferable to perform stress relief annealing treatment (SR treatment) between the quenching and heat treatment of the next process, for a purpose of removing residual stress. The quenching process will be described below in detail.

[Quenching Process]

The hollow shell subjected to the hot working is subjected to quenching. By setting quenching conditions, the prior γ grain diameter is adjusted to less than 5 μm, and the block diameter is adjusted to less than 2 μm. The quenching is performed using, for example, high-frequency induction furnace. In a case of using the high-frequency induction furnace, a heating rate to reach an end temperature, and the end temperature are controlled. A preferable heating start temperature is a room temperature. In this case, grain refinement is further facilitated. A preferable heating rate is 10° C./s or more, and a preferable end temperature is 850 to 920° C. When the end temperature is 1000° C. or less, it is possible to inhibit coarsening of the prior γ grain diameter. At the end temperature, the hollow shell is preferably retained for 5 to 180 seconds. When a retention time is 180 seconds or less, it is possible to inhibit coarsening of the prior γ grain diameter. When the other conditions are satisfied, and the heating rate is 10° C./s or more, it is possible to reduce the prior γ grain diameter to less than 5 μm.

Preferably, forced cooling at a cooling rate of 5° C./s or more is started before a temperature of a position where a cooling rate is the lowest of positions in a wall-thickness direction lowers to an $Ar_3$ point or less. In this case, the yield strength can be further enhanced more easily.

Preferably, the cooling rate for 500 to 200° C. is set at 5° C./s or more. As a result, it is possible to reduce the block diameter to less than 2 μm. In a case where Co is contained, when the heating rate in the above quenching is 10° C./s or more, the prior γ grain diameter can be adjusted to less than 5 μm, but when the cooling rate for 500 to 200° C. is less than 5° C./s, the block diameter becomes 2 μm or more. A more preferable lower limit of the cooling rate for 500 to 200° C. is 10° C./s.

The cooling rate for 500 to 200° C. can be set at 5° C./s or more by, for example, performing spray cooling with a spray water density set at 0.15 m³/min·m² or more.

The quenching treatment may be performed a plurality of times. In a case of performing the quenching treatment a plurality of times, it is preferable to perform SR treatment between a quenching treatment and a quenching treatment of the next stage, for a purpose of removing residual stress generated by the quenching treatment. Through SR treatment, it is possible to prevent occurrence of season cracking after the quenching. In a case of performing SR treatment, a preferable treatment temperature is 600° C. or less. In this case, coarsening of austenite can be inhibited.

In a case where the quenching treatment is performed a plurality of times, the cooling rate for 500 to 200° C. may be set at 5° C./s or more only in last quenching. As a result, it is possible to reduce the block diameter to less than 2 μm.

The quenching may be performed using a gas-fired furnace. When the quenching is performed using a gas-fired furnace, a preferable heating rate is 1° C./s or more, and a preferable end temperature is 850° C. to 1000° C. At the end temperature, the hollow shell is preferably retained for 10 minutes or more. When the quenching is performed using a gas-fired furnace, the quenching treatment needs to be performed a plurality of times to reduce the prior γ grain diameter to less than 5 μm. Also in this case, in a case where the treatment is performed a plurality of times, the cooling rate for 500 to 200° C. may be set at 5° C./s or more only in last quenching. As a result, it is possible to reduce the block diameter to less than 2 μm.

[Tempering Process]

Tempering treatment is performed after the quenching treatment. Through the tempering treatment, the yield strength of the steel material is adjusted to 862 to 965 MPa. A preferable lower limit of a tempering temperature is 650° C. A preferable upper limit of the tempering temperature is 730° C. A preferable retention time at the tempering temperature is 5 to 180 minutes.

In the producing method described above, a method for producing a steel pipe is described as an example. However, when the steel material according to the present invention may be a steel plate or have another shape, a method for producing the steel plate similarly includes the preparing process, the hot working process, the quenching process, and the tempering process.

EXAMPLES

Molten steels each weighing 180 kg and containing chemical compositions shown in Table 4 and Table 5 were produced.

TABLE 4

| | CHEMICAL COMPOSITION (UNIT IS mass %, BALANCE BEING Fe AND IMPURITIES) | | | | | | | | | | | | | |
|---|---|---|---|---|---|---|---|---|---|---|---|---|---|---|
| STEEL | C | Si | Mn | P | S | Al | N | Cr | Mo | Co | Ti | Nb | Cu | Ni |
| A | 0.26 | 0.25 | 0.44 | 0.020 | 0.003 | 0.030 | 0.0040 | 1.25 | 0.95 | 0.40 | 0.013 | 0.016 | 0.01 | 0.02 |
| B | 0.31 | 0.31 | 0.55 | 0.009 | 0.002 | 0.033 | 0.0035 | 0.70 | 0.95 | 0.25 | 0.014 | 0.011 | 0.03 | 0.02 |
| C | 0.27 | 0.30 | 0.75 | 0.006 | 0.001 | 0.035 | 0.0032 | 1.45 | 0.95 | 1.10 | 0.014 | 0.011 | 0.02 | 0.01 |
| D | 0.27 | 0.30 | 0.37 | 0.008 | 0.001 | 0.035 | 0.0032 | 1.00 | 0.75 | 0.35 | 0.014 | 0.011 | 0.02 | 0.01 |
| E | 0.27 | 0.28 | 0.43 | 0.006 | 0.001 | 0.035 | 0.0032 | 0.80 | 0.71 | 0.25 | 0.008 | 0.020 | 0.02 | 0.03 |
| F | 0.27 | 0.30 | 0.36 | 0.005 | 0.001 | 0.035 | 0.0032 | 1.00 | 0.75 | 0.35 | 0.014 | 0.025 | 0.02 | 0.01 |
| G | 0.23 | 0.31 | 0.65 | 0.006 | 0.001 | 0.035 | 0.0032 | 0.63 | 0.87 | 0.35 | 0.014 | 0.022 | 0.35 | 0.45 |
| H | 0.35 | 0.31 | 0.32 | 0.006 | 0.001 | 0.035 | 0.0032 | 0.63 | 1.23 | 0.65 | 0.014 | 0.025 | 0.02 | 0.05 |
| I | 0.35 | 0.30 | 0.33 | 0.010 | 0.001 | 0.035 | 0.0032 | 0.63 | 0.90 | 0.05 | 0.010 | 0.025 | 0.03 | 0.02 |

TABLE 4-continued

| | CHEMICAL COMPOSITION (UNIT IS mass %, BALANCE BEING Fe AND IMPURITIES) | | | | | | | | | | | | | |
|---|---|---|---|---|---|---|---|---|---|---|---|---|---|---|
| STEEL | C | Si | Mn | P | S | Al | N | Cr | Mo | Co | Ti | Nb | Cu | Ni |
| J | 0.35 | 0.30 | 0.33 | 0.010 | 0.001 | 0.035 | 0.0032 | 0.63 | 0.95 | 0.15 | 0.010 | 0.042 | 0.02 | 0.01 |
| K | 0.27 | 0.28 | 0.29 | 0.013 | 0.001 | 0.035 | 0.0032 | 0.95 | 1.33 | 0.35 | 0.010 | 0.023 | 0.03 | 0.05 |
| L | 0.26 | 0.25 | 0.44 | 0.020 | 0.003 | 0.030 | 0.0040 | 1.05 | 0.85 | — | 0.013 | 0.023 | 0.02 | 0.01 |
| M | 0.25 | 0.27 | 0.44 | 0.020 | 0.003 | 0.030 | 0.0030 | 0.95 | 1.50 | 0.03 | 0.009 | 0.023 | 0.02 | 0.01 |
| N | 0.26 | 0.31 | 0.45 | 0.020 | 0.003 | 0.030 | 0.0030 | 0.25 | 0.50 | 1.30 | 0.011 | 0.025 | 0.02 | 0.01 |
| O | 0.25 | 0.33 | 0.85 | 0.020 | 0.002 | 0.030 | 0.0030 | 1.15 | 0.55 | 0.25 | 0.009 | 0.023 | 0.02 | 0.02 |
| P | 0.14 | 0.32 | 0.44 | 0.007 | 0.001 | 0.030 | 0.0040 | 1.25 | 0.85 | 0.45 | 0.013 | 0.023 | 0.02 | 0.06 |
| Q | 0.27 | 0.34 | 0.45 | 0.009 | 0.001 | 0.033 | 0.0035 | 0.67 | 0.75 | 0.35 | 0.050 | 0.035 | 0.02 | 0.03 |
| R | 0.28 | 0.34 | 0.45 | 0.009 | 0.001 | 0.033 | 0.0035 | 1.00 | 0.68 | 0.25 | 0.012 | 0.002 | 0.02 | 0.03 |
| S | 0.27 | 0.34 | 0.45 | 0.011 | 0.001 | 0.032 | 0.0035 | 1.00 | 0.53 | 0.21 | 0.012 | 0.030 | 0.03 | 0.03 |

TABLE 5

| | CHEMICAL COMPOSITION (UNIT IS mass %, BALANCE BEING Fe AND IMPURITIES) | | | | | | EFFECTIVE | | |
|---|---|---|---|---|---|---|---|---|---|
| STEEL | V | B | W | Ca | Mg | REM | B | F1 | F2 |
| A | — | — | — | — | — | — | 0.0000 | 0.71 | 1.14 |
| B | 0.070 | — | — | — | — | — | 0.0000 | 0.71 | 1.12 |
| C | 0.050 | — | — | — | — | — | 0.0000 | 0.70 | 1.37 |
| D | 0.050 | 0.0008 | — | — | — | — | 0.0015 | 0.89 | 1.24 |
| E | 0.110 | 0.0012 | — | 0.0015 | — | — | 0.0005 | 0.88 | 1.09 |
| F | 0.050 | 0.0010 | — | 0.0012 | 0.0010 | — | 0.0017 | 0.88 | 1.25 |
| G | 0.090 | 0.0013 | — | 0.0010 | — | — | 0.0020 | 0.90 | 1.01 |
| H | 0.090 | 0.0007 | — | 0.0010 | — | — | 0.0014 | 0.94 | 2.66 |
| I | 0.090 | 0.0012 | 0.25 | — | — | — | 0.0010 | 0.97 | 1.30 |
| J | 0.040 | — | 0.33 | 0.0013 | — | — | 0.0000 | 0.71 | 1.51 |
| K | 0.090 | 0.0012 | — | — | — | 0.0020 | 0.0010 | 0.99 | 1.75 |
| L | 0.050 | — | — | — | — | — | 0.0000 | 0.73 | 0.69 |
| M | 0.080 | 0.0012 | — | — | — | — | 0.0009 | 1.08 | 1.03 |
| N | 0.090 | — | — | — | — | — | 0.0000 | 0.29 | 3.24 |
| O | 0.080 | — | — | — | — | — | 0.0000 | 0.71 | 0.55 |
| P | 0.050 | 0.0013 | — | — | — | — | 0.0012 | 0.82 | 1.02 |
| Q | 0.090 | 0.0013 | — | 0.0015 | — | — | 0.0101 | 0.84 | 1.29 |
| R | 0.090 | 0.0013 | — | 0.0015 | — | — | 0.0013 | 0.92 | 0.97 |
| S | 0.090 | 0.0013 | — | — | — | — | 0.0013 | 0.89 | 0.84 |

Using the molten steels, ingots were produced. Referring to Table 6, as to Test Number 1 to Test Number 20, and Test Number 26 to Test Number 28, their ingots were subjected to hot rolling to be produced into steel plates each having a thickness of 15 mm. As to Test Number 20, its quenching conditions are the same for three quenchings.

TABLE 6

| TEST NUMBER | STEEL | HOT ROLLING FINISHING TEMPERATURE (° C.) | QUENCHING HEATING MEANS | QUENCHING HEATING RATE (° C./s) | QUENCHING TEMPERATURE (° C.) | COOLING RATE (° C./s) FOR 500 TO 200° C. | PRIOR γ GRAIN DIAMETER (μm) | TEMPERING TEMPERATURE (° C.) | BLOCK DIAMETER (μm) |
|---|---|---|---|---|---|---|---|---|---|
| 1 | A | 1000 | INDUCTION HEATING | 10 | 880 | 7 | 3.6 | 695 | 1.7 |
| 2 | B | 950 | INDUCTION HEATING | 15 | 890 | 8 | 3.3 | 700 | 1.5 |
| 3 | C | 950 | INDUCTION HEATING | 50 | 910 | 10 | 3.4 | 710 | 1.5 |
| 4 | D | 900 | INDUCTION HEATING | 50 | 900 | 10 | 3.4 | 710 | 1.3 |
| 5 | E | 900 | INDUCTION HEATING | 15 | 900 | 10 | 3.5 | 715 | 1.6 |
| 6 | F | 1000 | INDUCTION HEATING | 15 | 900 | 10 | 4.1 | 710 | 1.8 |
| 7 | G | 880 | INDUCTION HEATING | 50 | 900 | 10 | 3.3 | 700 | 1.6 |
| 8 | H | 880 | INDUCTION HEATING | 50 | 900 | 10 | 3.1 | 700 | 1.5 |
| 9 | I | 900 | INDUCTION HEATING | 50 | 900 | 10 | 3.5 | 700 | 1.8 |

TABLE 6-continued

| TEST NUMBER | STEEL | HOT ROLLING FINISHING TEMPERATURE (° C.) | QUENCHING HEATING MEANS | QUENCHING HEATING RATE (° C./s) | QUENCHING TEMPERATURE (° C.) | COOLING RATE (° C./s) FOR 500 TO 200° C. | PRIOR γ GRAIN DIAMETER (μm) | TEMPERING TEMPERATURE (° C.) | BLOCK DIAMETER (μm) |
|---|---|---|---|---|---|---|---|---|---|
| 10 | J | 900 | INDUCTION HEATING | 50 | 900 | 10 | 3.1 | 700 | 1.2 |
| 11 | K | 1000 | INDUCTION HEATING | 15 | 900 | 10 | 4.2 | 700 | 1.8 |
| 12 | L | 900 | INDUCTION HEATING | 50 | 900 | 10 | 3.6 | 700 | 1.7 |
| 13 | M | 900 | INDUCTION HEATING | 50 | 900 | 10 | 3.8 | 700 | 1.8 |
| 14 | N | 900 | INDUCTION HEATING | 50 | 900 | 10 | 3.6 | 680 | 1.6 |
| 15 | O | 900 | INDUCTION HEATING | 50 | 900 | 10 | 3.6 | 680 | 1.6 |
| 16 | P | 900 | INDUCTION HEATING | 50 | 900 | 10 | 4.2 | 660 | 1.8 |
| 17 | Q | 880 | INDUCTION HEATING | 50 | 900 | 10 | 3.3 | 700 | 1.6 |
| 18 | R | 880 | INDUCTION HEATING | 50 | 900 | 10 | 7.3 | 700 | 3.8 |
| 19 | A | 900 | QUENCHING ONCE IN GAS-FIRED FURNACE | 1 | 880 | 10 | 10.0 | 700 | 4.2 |
| 20 | A | 900 | QUENCHING THREE TIMES IN GAS-FIRED FURNACE | 1 | 880 | 10 | 4.7 | 700 | 1.9 |
| 21 | B | 650 | INDUCTION HEATING | 50 | 900 | 10 | 2.6 | 700 | 0.9 |
| 22 | C | 700 | INDUCTION HEATING | 50 | 900 | 10 | 2.3 | 700 | 0.8 |
| 23 | D | 600 | INDUCTTON HEATING | 50 | 900 | 10 | 2.4 | 700 | 0.8 |
| 24 | E | 600 | INDUCTION HEATING | 50 | 900 | 10 | 2.4 | 700 | 0.8 |
| 25 | F | 600 | INDUCTION HEATING | 50 | 900 | 10 | 2.5 | 700 | 0.8 |
| 26 | S | 600 | INDUCTION HEATING | 50 | 900 | 10 | 2.6 | 700 | 1.2 |
| 27 | A | 650 | INDUCTION HEATING | 10 | 900 | 2 | 4.1 | 700 | 2.2 |
| 28 | L | 650 | INDUCTION HEATING | 10 | 900 | 2 | 4.2 | 700 | 1.6 |

The steel plates subjected to the hot rolling were subjected to allowing cooling to lower temperatures of the steel plates to normal temperature. Each of the steel plates was reheated under quenching conditions shown in Table 6 and then quenched at cooling rates for 500 to 200° C. shown in Table 6.

When quenching heating was performed in a high-frequency induction furnace, a retention time at the end temperature was 5 seconds. When the quenching heating was performed by atmospheric heating in a gas-fired furnace, the retention time at the end temperature was 10 minutes.

After the quenching, each steel plate was subjected to the tempering treatment at tempering temperatures shown in Table 6. The tempering temperatures were adjusted so that the steel plates have 125 ksi grade of the API standard. For all steel plates, the retention time at the tempering temperatures was set at 60 minutes. Through the above producing processes, each steel plate was produced.

For Test Number 21 to Test Number 25, the quenching and the tempering were each performed twice. Specifically, the ingots were rolled finishing at 1000° C. to have a thickness of 35 mm, subjected to first quenching by water cooling, and tempered at the same temperatures as respective hot rolling finishing temperatures in the next process (shown in Table 6). In addition, the hot rolling was performed at the hot rolling finishing temperatures shown in Table 6 to produce steel plates having a thickness of 15 mm. Through the hot rolling, their structures were refined. The subsequent processes, that is, a second quenching process and subsequent process are performed as with Test Number 1 to Test Number 20 and Test Number 26 to Test Number 28.

[Evaluation Test]
[Test of Measuring Prior γ Grain Diameter]

From a wall-thickness center portion of a plate product as finally quenched, a test specimen was taken and its average grain diameter of prior γ grains was measured by the method described above.

[Yield Strength (YS) and Tensile Strength (TS) Test]

From a plate-thickness center of each steel plate subjected to the quenching and the tempering described above, a round-bar tensile test specimen having a diameter of 6.35 mm and a parallel portion length of 35 mm was fabricated. An axis direction of each tensile test specimen was the same as a rolling direction of the steel plate. Each round-bar specimen was used to perform a tensile test at normal temperature (25° C.) in the atmosphere, and yield strengths (YS) (MPa) and tensile strengths (TS) at positions were obtained. In the present example, lower yield points obtained by the tensile test were defined as yield strengths (YS) of the respective Test Numbers.

[Microstructure Determination Test]

Each steel plate subjected to the final quenching and tempering described above was subjected to the Rockwell hardness (HRC) test conforming to JIS Z2245(2011). Specifically, Rockwell hardness (HRC) were determined at any three spots in each of a 2.0-mm depth position from a top surface of the steel plate, a 2.0-mm depth position from a bottom surface of the steel plate, and a thickness-direction center position of the steel plate. As to every Test Number except Test Number 14, its difference ΔHRC between a maximum value and a minimum value of the Rockwell hardness at the nine points was less than 2.0. Accordingly, in the microstructure of the present embodiment, it is considered that the volume ratio of tempered martensite and tempered bainite was 90% or more in total even at the position of HRCmin.

[Test of Measuring Block Diameter]

From a plate-thickness center portion of each steel plate subjected to the quenching treatment and the tempering treatment described above, a test specimen was taken and its average block diameter was measured by the method described above.

[DCB Test]

Figure 2A:
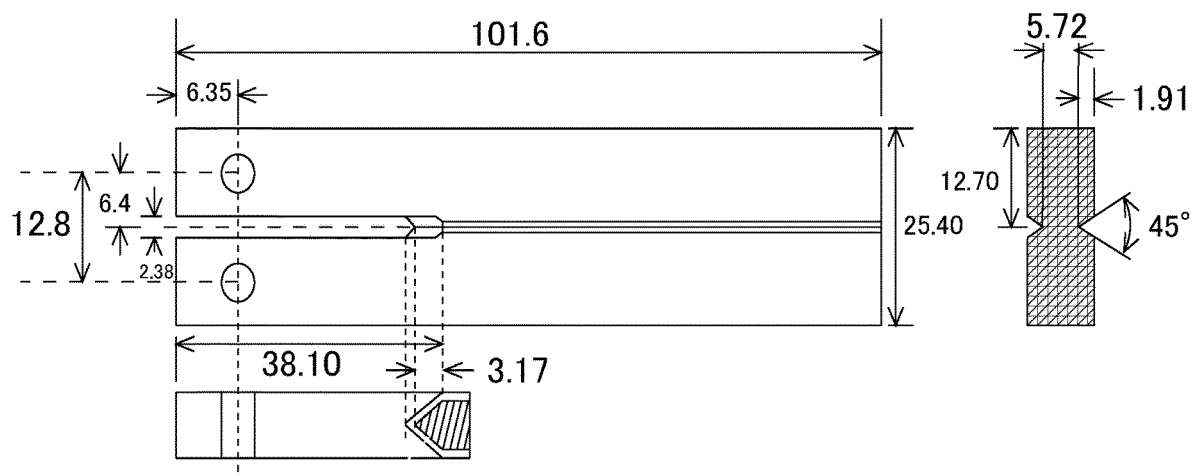
FIG. 2A is a side view and a cross-sectional view of a DCB test specimen used in a DCB test in Examples. Numeric values in FIG. 2A indicate dimensions of corresponding portions (in mm).
Figure 2B:
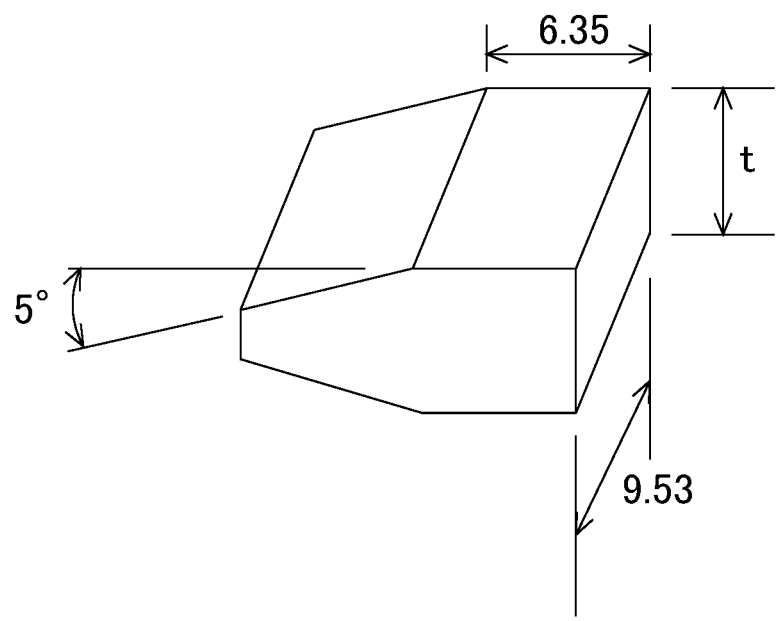
FIG. 2B is a perspective view of a wedge used in the DCB test in Examples. Numeric values in FIG. 2B indicate dimensions of corresponding portions (in mm).

The DCB test conforming to NACE TM0177-96 Method D was conducted on each steel plate to evaluate its SSC resistance. Specifically, from a thickness center portion of each steel plate, three DCB test specimens illustrated in FIG. 2A were taken. The DCB test specimens were taken such that their longitudinal directions were parallel to their rolling directions. From each steel plate, in addition, a wedge illustrated in FIG. 2B was fabricated. The wedge had a thickness t of 2.92 mm.

The wedge was driven between arms of a DCB test specimen. Thereafter, the DCB test specimen with the wedge driven was enclosed in an autoclave. Into the autoclave, a solution including a 5% deaerated salt solution, acetic acid, and sodium acetate mixed together and adjusted to be pH 3.5 was injected in such a manner that a gas portion is left in the autoclave. Then, a hydrogen sulfide gas at 10 atm was filled as pressurized in the autoclave, and a liquid phase was stirred to saturate high-pressure hydrogen sulfide gas in the solution.

The autoclave subjected to the processes above was sealed and then retained at 25° C. for 336 hours while the solution was stirred. Thereafter, the autoclave was decompressed, and the DCB test specimen was taken out.

Pins are inserted into holes formed in arm ends of the DCB test specimen taken out, and a notched portion is opened by a tensile test machine to measure a wedge opening stress P. In addition, the notch of the DCB test specimen was opened in a liquid nitrogen, and a crack propagation length a was measured as the DCB test specimen was immersed. The crack propagation length a was measured by visual check using a vernier caliper. Based on the obtained wedge opening stress P and the crack propagation length a, a fracture toughness value $K_{ISSC}$ (MPa√m) was determined using Formula (4).

[Expression 1]

$$K_{Issc} = \frac{Pa(2\sqrt{3} + 2.38h/a)(B/B_n)^{1/\sqrt{3}}}{Bh^{3/2}} \quad (4)$$

In Formula (4), h denotes a height (mm) of each arm of the DCB test specimen, B denotes a thickness (mm) of the DCB test specimen, and $B_n$ denotes a web thickness (mm) of the DCB test specimen. These are defined in NACE TM0177-96 Method D.

For each Test Number, fracture toughness values $K_{ISSC}$ (MPa√m) of three DCB test specimen were determined. For each steel plate, an average of the fracture toughness values of the three of DCB test specimens was defined as a fracture toughness value $K_{ISSC}$ (MPa√m) of the each steel plate. Resultant fracture toughness values $K_{ISSC}$ are shown in Table 7. When the fracture toughness value $K_{ISSC}$ value defined above was 35 MPa√m or more, the steel plate was determined to have a good SSC resistance. Note that a space between the arms between which a wedge is driven before the immersion in a test bath influences the value of $K_{ISSC}$. Therefore, the space between the arms was actually measured with a micrometer, and it was confirmed that the space fell within the API standard.

TABLE 7

| TEST NUMBER | STEEL | YS (MPa) | TS (MPa) | $K_{ISSC}$ (MPa√m) | | | AVERAGE VALUE |
|---|---|---|---|---|---|---|---|
| | | | | 1 | 2 | 3 | |
| 1 | A | 910 | 958 | 35.0 | 35.5 | 36.0 | 35.5 |
| 2 | B | 922 | 971 | 36.6 | 36.8 | 36.0 | 36.5 |
| 3 | C | 920 | 948 | 38.0 | 36.5 | 37.3 | 37.3 |
| 4 | D | 918 | 946 | 38.0 | 38.0 | 38.0 | 38.0 |
| 5 | E | 908 | 936 | 38.7 | 38.5 | 38.8 | 38.7 |
| 6 | F | 905 | 953 | 36.5 | 36.0 | 36.7 | 36.4 |
| 7 | G | 910 | 944 | 35.7 | 36.1 | 35.5 | 35.8 |
| 8 | H | 912 | 960 | 37.7 | 38.7 | 38.7 | 38.4 |
| 9 | I | 905 | 933 | 36.7 | 36.5 | 36.0 | 36.4 |
| 10 | J | 925 | 944 | 37.5 | 37.0 | 37.5 | 37.3 |
| 11 | K | 910 | 958 | 35.6 | 36.5 | 36.0 | 36.0 |
| 12 | L | 920 | 968 | 33.5 | 33.0 | 32.5 | 33.0 |
| 13 | M | 911 | 959 | 28.5 | 27.8 | 28.8 | 28.4 |
| 14 | N | 923 | 1026 | 27.3 | 28.6 | 27.3 | 27.7 |
| 15 | O | 908 | 956 | 29.5 | 30.5 | 29.5 | 29.8 |
| 16 | P | 915 | 945 | 27.5 | 27.0 | 26.5 | 27.0 |
| 17 | Q | 910 | 937 | 27.5 | 35.6 | 36.1 | 33.1 |
| 18 | R | 922 | 990 | 24.7 | 25.6 | 24.3 | 24.9 |
| 19 | A | 910 | 989 | 25.4 | 25.6 | 26.5 | 25.8 |
| 20 | A | 905 | 943 | 35.5 | 35.0 | 36.5 | 35.7 |
| 21 | B | 935 | 955 | 37.7 | 37.2 | 36.7 | 37.2 |
| 22 | C | 940 | 960 | 37.3 | 36.5 | 37.2 | 37.0 |
| 23 | D | 945 | 966 | 37.8 | 37.5 | 36.8 | 37.4 |
| 24 | E | 943 | 962 | 37.0 | 36.5 | 37.8 | 37.1 |
| 25 | F | 940 | 958 | 37.5 | 36.5 | 37.0 | 37.0 |
| 26 | S | 935 | 966 | 29.1 | 28.7 | 27.9 | 28.6 |
| 27 | A | 929 | 986 | 27.4 | 28.2 | 27.5 | 27.7 |
| 28 | L | 915 | 975 | 25.7 | 25.6 | 26.8 | 26.0 |

[Test Results]

Test results are shown in Table 6 and Table 7.

As to Test Number 1 to Test Number 11, and Test Number 20, chemical compositions of their steel plates were appropriate and satisfied Formula (1) and Formula (2). In addition, since their ΔHRCs were less than 2.0, their microstructure evaluations were good, and a total of 90% by volume or more of each of their microstructures consisted of tempered martensite and tempered bainite. In addition, their prior γ grain diameters were less than 5 μm. In addition, since their cooling rates for 500 to 200° C. in the quenching were 5°

C./s or more, their block diameters were less than 2 μm. As a result, values of $K_{ISSC}$ of Test Number 1 to Test Number 11, and Test Number 20 were 35 MPa√m or more, exhibiting excellent SSC resistance. Yield strengths of Test Number 1 to Test Number 11, and Test Number 20 were 900 MPa or more, exhibiting high yield strengths.

As to Test Number 21 to Test Number 25, chemical compositions of their steel plates were appropriate and satisfied Formula (1) and Formula (2). In addition, since their ΔHRCs were less than 2.0, their microstructure evaluations were good, and a total of 90% by volume or more of each of their microstructures consisted of tempered martensite and tempered bainite. For steel plates of Test Number 21 to Test Number 25, the quenching and the tempering were each performed twice, and a finishing temperature of the hot rolling (before the quenching) was set low to refine their structures, so that their prior γ grain diameters was able to be refined to 3 μm or less. In addition, since their cooling rates for 500 to 200° C. in the quenching were 10° C./s or more, their block diameters was able to be extremely refined to 1 μm or less. As a result, their values of $K_{ISSC}$ were 35 MPa√m or more while their yield strengths were more than 930 MPa, exhibiting excellent SSC resistance.

In contrast, as to a steel plate of Test Number 12, it contained no Co, and its F2 fell below the lower limit of Formula (2). As a result, its value of $K_{ISSC}$ was less than 35 MPa√m, indicating a poor SSC resistance.

As to a steel plate of Test Number 13, its Co content was low. As a result, its value of $K_{ISSC}$ was less than 35 MPa√m, indicating a poor SSC resistance.

As to a steel plate of Test Number 14, its F1 fell below the lower limit of Formula (1). Its hardenability therefore deteriorated, its microstructure evaluation was no good because its ΔHRC was 2.0 or more, and a volume ratio of tempered martensite and tempered bainite of its microstructure was less than 90% in total. As a result, its value of $K_{ISSC}$ was less than 35 MPa√m, indicating a poor SSC resistance. The reason for the low fracture toughness value $K_{ISSC}$ is considered to be due to its microstructure, which was a nonuniform structure including tempered martensite and tempered bainite as well as retained austenite.

As to a steel plate of Test Number 15, its Mn exceeded its upper limit, and its F2 fell below the lower limit of Formula (2). As a result, its value of $K_{ISSC}$ was less than 35 MPa√m, indicating a poor SSC resistance. The reason for the poor SSC resistance is considered to be due to a ratio of its content of SSC-resistant enhancing elements (C, Mo, Co) to its content of Mn and Cr, which was too low.

As to a steel plate of Test Number 16, its content of C was too low. Therefore, to obtain a desired strength, the tempering was performed at a low temperature. As a result, its value of $K_{ISSC}$ was less than 35 MPa√m, indicating a poor SSC resistance.

As to a steel plate of Test Number 17, its content of Ti was too high. As a result, its value of $K_{ISSC}$ was less than 35 MPa√m, indicating a poor SSC resistance. The reason for this is considered to be due to coarse TiN being present in its steel microstructure.

As to a steel plate of Test Number 18, its content of Nb was too low, and its F2 fell below the lower limit of Formula (2). Therefore, its prior γ grains became 5 μm or more in the quenching, and its block diameter after the tempering was 2 μm or more. As a result, its value of $K_{ISSC}$ was less than 35 MPa√m, indicating a poor SSC resistance.

As to a steel plate of Test Number 19, a chemical composition of its steel was appropriate and satisfied Formula (1) and Formula (2), but the quenching treatment was not performed properly. Therefore, its prior γ grain diameter became 5 μm or more in the quenching, and its block diameter after the tempering was 2 μm or more. As a result, its value of $K_{ISSC}$ was less than 35 MPa√m, indicating a poor SSC resistance.

As to a steel plate of Test Number 26, the quenching treatment was performed properly, but a chemical composition of its steel did not satisfy Formula (2). As a result, its value of $K_{ISSC}$ was less than 35 MPa√m, indicating a poor SSC resistance.

As to a steel plate of Test Number 27, a chemical composition of its steel was appropriate and satisfied Formula (1) and Formula (2), and its heating rate in the quenching was 10° C./s or more, but its cooling rate for 500 to 200° C. in the quenching was less than 5° C./s. Therefore, while its prior γ grain diameter was less than 5 μm, its block diameter after the tempering became 2 μm or more. As a result, its value of $K_{ISSC}$ was less than 35 MPa√m, indicating a poor SSC resistance.

As to a steel plate of Test Number 28, it contained no Co. Therefore, while its cooling rate for 500 to 200° C. in the quenching was less than 5° C./s, its block diameter after the tempering became less than 2 μm. However, since it contained no Co, its value of $K_{ISSC}$ was less than 35 MPa√m, indicating a poor SSC resistance.

The embodiment according to the present invention has been described above. However, the aforementioned embodiment is merely an example for practicing the present invention. Therefore, the present invention is not limited to the aforementioned embodiment, and the aforementioned embodiment can be modified and implemented as appropriate without departing from the scope of the present invention.

INDUSTRIAL APPLICABILITY

The steel material according to the present invention was widely applicable to steel materials used in sour environments, suitably available as steel materials for oil well used in oil well environments, more suitably available to oil-well steel pipes for casing, tubing and the like.

The invention claimed is:
1. A steel material comprising a chemical composition consisting of, in mass %:
C: 0.15 to 0.45%,
Si: 0.10 to 1.0%,
Mn: 0.10 to 0.8%,
P: 0.050% or less,
S: 0.010% or less,
Al: 0.01 to 0.1%,
N: 0.010% or less,
Cr: 0.1 to 2.5%,
Mo: 0.35 to 3.0%,
Co: 0.05 to 2.0%,
Ti: 0.003 to 0.040%,
Nb: 0.003 to 0.050%,
Cu: 0.01 to 0.50%,
Ni: 0.01 to 0.50%,
V: 0 to 0.5%,
B: 0 to 0.003%,
W: 0 to 1.0%,
Ca: 0 to 0.004%,
Mg: 0 to 0.004%, and
rare earth metal: 0 to 0.004%,
with the balance being Fe and impurities, and satisfying Formulae (1) and (2), wherein a prior-austenite grain diameter of a microstructure is less than 5 μm, a block diameter of the microstructure is less than 2 μm, and the microstructure contains a total of 90% by volume or more of tempered martensite and tempered bainite:

$$C+Mn/6+(Cr+Mo+V)/5+(Cu+Ni)/15-Co/6+\alpha \geq 0.70 \quad (1)$$

$$(3C+Mo+3Co)/(3Mn+Cr) \geq 1.0 \quad (2)$$

$$\text{Effective } B = B - 11(N-Ti/3.4)/14 \quad (3)$$

where α in Formula (1) is 0.250 when the effective B defined by Formula (3) (mass %) is 0.0003% or more, or zero when the effective B is less than 0.0003%, and symbols of elements in Formula (1) to Formula (3) are to be substituted by contents of corresponding elements (in mass %).

2. An oil-well steel pipe comprising,
the steel material according to claim 1, and
a wall thickness of 15 mm or more.

3. The steel material according to claim 1, wherein the chemical composition contains one or more types of element selected from the group consisting of:
Ca: 0.0003 to 0.004%;
Mg: 0.0003 to 0.004%; and
rare earth metal: 0.0003 to 0.004%.

4. An oil-well steel pipe comprising,
the steel material according to claim 3, and
a wall thickness of 15 mm or more.

5. The steel material according to claim 1, wherein the chemical composition contains
V: 0.015 to 0.5%.

6. An oil-well steel pipe comprising,
the steel material according to claim 5, and
a wall thickness of 15 mm or more.

7. The steel material according to claim 5, wherein the chemical composition contains one or more types of element selected from the group consisting of:

B: 0.0003 to 0.003%; and
W: 0.05 to 1.0%.

8. An oil-well steel pipe comprising,
the steel material according to claim 7, and
a wall thickness of 15 mm or more.

9. The steel material according to claim 7, wherein the chemical composition contains one or more types of element selected from the group consisting of:
Ca: 0.0003 to 0.004%;
Mg: 0.0003 to 0.004%; and
rare earth metal: 0.0003 to 0.004%.

10. An oil-well steel pipe comprising,
the steel material according to claim 9, and
a wall thickness of 15 mm or more.

11. The steel material according to claim 5, wherein the chemical composition contains one or more types of element selected from the group consisting of:
Ca: 0.0003 to 0.004%;
Mg: 0.0003 to 0.004%; and
rare earth metal: 0.0003 to 0.004%.

12. An oil-well steel pipe comprising,
the steel material according to claim 11, and
a wall thickness of 15 mm or more.

13. The steel material according to claim 1, wherein the chemical composition contains one or more types of element selected from the group consisting of:
B: 0.0003 to 0.003%; and
W: 0.05 to 1.0%.

14. An oil-well steel pipe comprising,
the steel material according to claim 13, and
a wall thickness of 15 mm or more.

15. The steel material according to claim 13, wherein the chemical composition contains one or more types of element selected from the group consisting of:
Ca: 0.0003 to 0.004%;
Mg: 0.0003 to 0.004%; and
rare earth metal: 0.0003 to 0.004%.

16. An oil-well steel pipe comprising,
the steel material according to claim 15, and
a wall thickness of 15 mm or more.

* * * * *